United States Patent
Chesla et al.

(10) Patent No.: US 10,110,485 B2
(45) Date of Patent: Oct. 23, 2018

(54) TECHNIQUES FOR TRAFFIC DIVERSION IN SOFTWARE DEFINED NETWORKS FOR MITIGATING DENIAL OF SERVICE ATTACKS

(71) Applicant: RADWARE, LTD., Tel Aviv (IL)

(72) Inventors: Avi Chesla, Tel-Aviv (IL); Ehud Doron, Moddiin (IL)

(73) Assignee: Radware, Ltd., Tel Aviv (IL)

( * ) Notice: Subject to any disclaimer, the term of this patent is extended or adjusted under 35 U.S.C. 154(b) by 208 days.

(21) Appl. No.: 14/728,405

(22) Filed: Jun. 2, 2015

(65) Prior Publication Data
US 2016/0381069 A1 Dec. 29, 2016

Related U.S. Application Data

(63) Continuation of application No. 13/913,916, filed on Jun. 10, 2013, now Pat. No. 9,055,006.

(60) Provisional application No. 61/658,134, filed on Jun. 11, 2012.

(51) Int. Cl.
| | | |
|---|---|---|
| H04L 29/00 | (2006.01) | |
| H04L 12/741 | (2013.01) | |
| H04L 29/08 | (2006.01) | |
| H04L 12/715 | (2013.01) | |
| H04L 12/24 | (2006.01) | |
| H04L 12/717 | (2013.01) | |

(Continued)

(52) U.S. Cl.
CPC .............. *H04L 45/74* (2013.01); *H04L 41/12* (2013.01); *H04L 45/42* (2013.01); *H04L 45/64* (2013.01); *H04L 63/1416* (2013.01); *H04L 67/327* (2013.01); *H04L 45/00* (2013.01); *H04L 63/0892* (2013.01)

(58) Field of Classification Search
CPC .................................. G06F 11/00; H04L 9/32
USPC .......................................................... 726/22
See application file for complete search history.

(56) References Cited

U.S. PATENT DOCUMENTS

| | | | |
|---|---|---|---|
| 7,412,723 B2 * | 8/2008 | Blake | H04L 63/0227 709/220 |
| 7,415,018 B2 | 8/2008 | Jones et al. | |
| 2002/0169858 A1 | 11/2002 | Bellinger et al. | |

(Continued)

OTHER PUBLICATIONS

Syed Akbar Medhi, Junaid Khalid, Syed Ali Khayam/ RevisitingTraffic Anomaly Detection Using Software Defined Networking/2011/ NUST School of Electrical Engineering/ pp. 161-180.*

(Continued)

*Primary Examiner* — Anthony Brown
*Assistant Examiner* — Michael D Anderson
(74) *Attorney, Agent, or Firm* — M&B IP Analysts, LLC

(57) ABSTRACT

A method and system for mitigating of cyber-attacks in a software defined network (SDN) are presented. The method comprises operating a central controller and the SDN in a peace mode; monitoring traffic addressed to at least one destination server to detect at least an attack performed against the at least one destination server; switching an operation of the central controller to an attack mode, upon detection of an attack against the at least one destination server; and instructing, by the central controller, network elements of the SDN to divert all suspicious incoming traffic addressed to the at least one destination server to a security server, thereby mitigating the detected attack.

27 Claims, 5 Drawing Sheets

(51) Int. Cl.
    *H04L 12/701*     (2013.01)
    *H04L 29/06*     (2006.01)

(56) References Cited

U.S. PATENT DOCUMENTS

| | | |
|---|---|---|
| 2007/0094741 A1* | 4/2007 | Lynn .................. H04L 41/0893 |
| | | 726/26 |
| 2008/0098476 A1 | 4/2008 | Syversen |
| 2009/0138577 A1 | 5/2009 | Casado et al. |
| 2010/0046532 A1 | 2/2010 | Okita |
| 2013/0051399 A1 | 2/2013 | Zhang et al. |
| 2013/0058341 A1 | 3/2013 | Fulton et al. |
| 2013/0070762 A1 | 3/2013 | Adams et al. |
| 2013/0124707 A1 | 5/2013 | Ananthapadmanabha et al. |
| 2013/0272305 A1 | 10/2013 | Lefebvre et al. |
| 2013/0318243 A1 | 11/2013 | Chinthalapati et al. |
| 2014/0247714 A1 | 9/2014 | Sonoda et al. |
| 2015/0023210 A1 | 1/2015 | Kis |

OTHER PUBLICATIONS

Wonkyu Han, Ziming Zhao, Adam Doupe, Gail-Joon Ahn/ HoneyMix: Toward SDN-based Intelligent Honeynet/ 2009/Arizona Staute University/pp. 1-6.*

Ayed Mehdi, Junaid Khalid, Syed Khayam/ Revisiting Traffic Anomaly Detection using Software Defined Networking/ School of EE and CS National University of Sciences and Technology/ 2011/pp. 1-20.*

NEC Corporation of America, "Radware Denial-of-Service (DoS) Secured Virtuall Tenant Networks (VTN)", 2012, pp. 1-11.

* cited by examiner

| IPv4 Header Format | | | | | |
|---|---|---|---|---|---|
| Offsets | Octet | 0 | 1 | 2 | 3 |
| Octet | Bit | 0 1 2 3 4 5 6 7 | 8 9 10 11 12 13 14 15 | 16 17 18 19 20 21 22 23 | 24 25 26 27 28 29 30 31 |
| 0 | 0 | Version / IHL | DSCP 313 / ECN | Total Length | |
| 4 | 32 | Identification | | Flags 312 / Fragment Offset | |
| 8 | 64 | Time To Live 311 / Protocol | | Header Checksum | |
| 12 | 96 | Source IP Address | | | |
| 16 | 128 | Destination IP Address | | | |
| 20 | 160 | Options (if IHL > 5) | | | |

| Fixed header format IP6V ||||||
|---|---|---|---|---|---|
| Offsets | Octet | 0 | 1 | 2 | 3 |
| Octet | Bit | 0 1 2 3 4 5 6 7 | 8 9 10 11 12 13 14 15 | 16 17 18 19 20 21 22 23 | 24 25 26 27 28 29 30 31 |
| 0 | 0 | Version | Traffic Class 322 | Flow Label 323 ||
| 4 | 32 | Payload Length || Next Header | Hop Limit 321 |
| 8 | 64 | Source Address ||||
| 12 | 96 | ^ ||||
| 16 | 128 | ^ ||||
| 20 | 160 | ^ ||||
| 24 | 192 | Destination Address ||||
| 28 | 224 | ^ ||||
| 32 | 256 | ^ ||||
| 36 | 288 | ^ ||||

FIG. 3B

TECHNIQUES FOR TRAFFIC DIVERSION IN SOFTWARE DEFINED NETWORKS FOR MITIGATING DENIAL OF SERVICE ATTACKS

CROSS REFERENCE TO RELATED APPLICATIONS

This application is a continuation of U.S. patent application Ser. No. 13/913,916, filed on Jun. 10, 2013, now issued as U.S. Pat. No. 9,055,006. The Ser. No. 13/913,916 application claims the benefit of U.S. Provisional Application No. 61/658,134 filed on Jun. 11, 2012. The contents of these applications are herein incorporated by reference.

TECHNICAL FIELD

This disclosure generally relates to techniques for diverting traffic in software defined networks, and particularly for techniques for diverting traffic for the purpose of providing security services, in such networks.

BACKGROUND

A software defined networking (SDN) is a relatively new type of networking architecture that provides centralized management of network elements rather than a distributed architecture utilized by conventional networks. That is, in a distributed architecture each network element makes a routing, switching, and similar decisions based on the results of traffic processing and a distributed control mechanism. In contrast, in the SDN, a network element follows routing, or switching, decisions received from a central controller.

In detail, the operation of a network element can be logically divided into a "control path" and a "data path". In the control path, control protocols, e.g., for building in routing protocols, a spanning tree, and so on, are operable. In the data path, packets-processing operations are performed on a per-packet basis. Such operations include examining each incoming packet and making decisions based on the examination as to how to handle the input packet (e.g., packet forwarding, packet switching, bridging, load balancing, and so on). Furthermore, in a conventional network, network elements typically include both the control and data planes, whereas in a native SDN, the network elements include the data path, and the central controller implements the control path.

The SDN can be implemented in wide area networks (WANs), local area networks (LANs), the Internet, metropolitan area networks (MANs), ISP backbones, datacenters, inter-datacenter networks, and the like. Each network element in the SDN may be a router, a switch, a bridge, a load balancer, and so on, as well as any virtual instantiations thereof.

In one configuration of a SDN, the central controller communicates with the network elements using an Open-Flow protocol. Specifically, the OpenFlow protocol allows adding programmability to network elements for the purpose of packets-processing operations under the control of the central controller, thereby allowing the central controller to dynamically define the traffic handling decisions in the network element. To this end, traffic received by a network element that supports the OpenFlow protocol is processed and forwarded according to a set of rules defined by the central controller.

Traffic received by a network element that supports the OpenFlow protocol is processed and routed according to a set of rules defined by the central controller based on the characteristic of the required network operation. Such a network element routes traffic according to, for example, a flow table and occasionally sends packets to the central controller. Each network element is programmed with a flow table and can be modified by the central controller as required. The operation of network elements and the definition of flow tables according to the OpenFlow protocol is further described in the OpenFlow Switch Specifications issued by the Open Networking Foundation.

While the OpenFlow protocol allows programmability of network elements in the SDN, such means does not define how this capability can be utilized to efficiently provide value added services including, but not limited to, security services to users of the SDN.

In many instances of traffic processing for the purpose of service insertion, traffic should be diverted from its original path to be processed by servers (other than the destination server) and after such processing be relayed (or injected) back to the network to their original destination. However, conventional solutions for diverting and injecting traffic have a few limitations including, for example, relatively complicated diversion operations, because traffic diversion relies on dedicated border gateway protocol (BGP) announcements issued by special devices in the network, and loop tendency, because the conventional solutions for traffic injection can cause infinite packet loops. Furthermore, such configuration is generally cumbersome and may result in non-optimized paths and inefficient utilization of computing resources in routers (e.g., CPU time of routers).

Other conventional solutions for redirecting traffic include proxy or transparent proxy servers or network devices. Such network devices add more complexity into the network as they need to be deployed in line, creating an additional point of failure in the network.

Therefore, it would be advantageous to provide a solution for simple and efficient traffic diversion in the SDN.

SUMMARY

Certain embodiments disclosed herein include a method for mitigating of cyber-attacks in a software defined network (SDN). The method comprises: operating a central controller and the SDN in a peace mode; monitoring traffic addressed to at least one destination server to detect at least an attack performed against the at least one destination server; switching an operation of the central controller to an attack mode, upon detection of an attack against the at least one destination server; and instructing, by the central controller, network elements of the SDN to divert all suspicious incoming traffic addressed to the at least one destination server to at least one security server selected from a group of security servers, thereby mitigating the detected attack.

Certain embodiments disclosed herein also include a system for mitigating of cyber-attacks in a software defined networking (SDN) based network. The system comprises: a processor; a network-interface module connected to the SDN and configured to communicate and program network elements of the SDN; and a memory connected to the processor and configured to contain a plurality of instructions that when executed by the processor configure the system to: operate a central controller and the SDN in a peace mode; monitor traffic addressed to at least one destination server to detect at least an attack performed against the at least one destination server; switch an operation of the central controller to an attack mode, upon detection of an attack against the at least one destination server; and instruct, by the central controller, network elements of the SDN to divert all suspicious incoming traffic addressed to the at least one destination server to at least one security server selected from a group of security servers, thereby mitigating the detected attack.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

FIGS. 3A and 3B are diagrams of an IP packet header illustrating different possible embodiments for usage of a diversion field.

DETAILED DESCRIPTION

Figure 1:
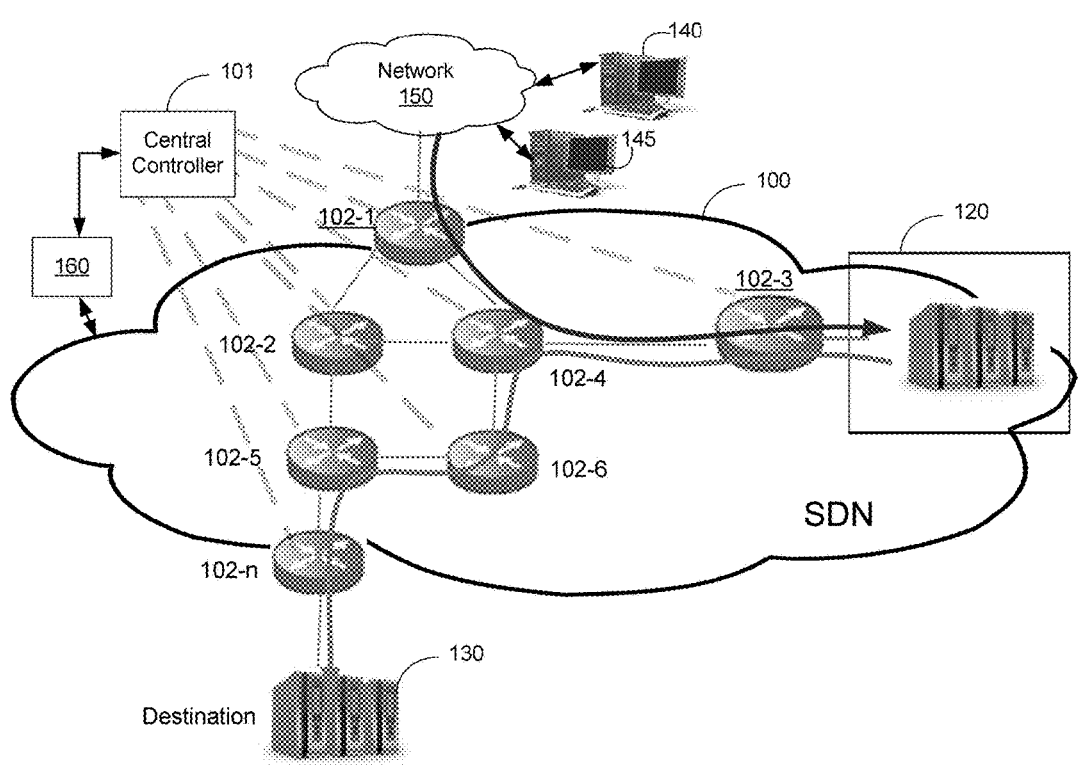
FIG. 1 illustrates a diagram of a SDN utilized to describe the various disclosed embodiments.

The embodiments disclosed herein are only examples of the many possible advantageous uses and implementations of the innovative teachings presented herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

FIG. 1 is an exemplary and non-limiting diagram illustrating a topology of a SDN-based network (hereinafter SDN) 100 utilized to describe the various embodiments discussed herein. The SDN—100 includes a central controller 101 and a plurality of network elements 102-1 through 102-N. To the SDN 100 are further connected a security server 120, a destination server 130, and clients 140, 145 that communicate with the destination server through a network 150 and the SDN-based network (hereinafter SDN) 100. The destination server 130 may be operable in a cloud-system infrastructure, a hosting server, service provider networks or a cooperate network.

The network 150 which is external to the SDN may be, for example, a WAN, the Internet, an Internet service provider (ISP) backbone, and the like. The SDN 100 can be implemented as wide area networks (WANs), local area networks (LANs), service provider backbones, datacenters, inter-datacenter networks, a private cloud, a public cloud, a hybrid cloud, and the like. It should be noted that although a pair of clients, one destination server, and one server 120 are depicted in FIG. 1 merely for the sake of simplicity, the embodiments disclosed herein can be applied to a plurality of clients, servers, and datacenters.

The security server 120 is configured to process traffic for the purpose of mitigating denial-of-service (DoS) or distributed DoS (DDoS) attacks against the destination server 130. The security server 120 is configured to perform one or more mitigation actions on the incoming traffic and forwards legitimate clean traffic to the server 130. In one embodiment, the security server 120 is also configured to detect and mitigate encrypted and large-scale DoS/DDoS attacks as detailed, for example, in U.S. Pat. Nos. 7,624,084 and 7,617,170 to Chelsa, et al., and hereby incorporated by reference.

According to certain configurations, an attack detection device 160 is connected to the central controller 101. The device 160 is configured to provide the central controller 101 with information about, for example, the network conditions, potential attacks, and so on. Based, in part, on the information received from device 160, the controller 101 is configured to program the network elements 102 with routing decisions that they should take. In a preferred embodiment, the attack detection device 160 is further configured to detect DoS/DDoS attacks by determining if an incoming traffic is suspected of including threats by monitoring traffic addressed to the destination sever 130. The attack detection 160 can be configured to detect DoS/DDoS attacks based on network and bandwidth statistics, such as an average number of active connections, an average number of packets received per second, and other DoS/DDoS detection attacks known in the related art.

According to various embodiments disclosed herein, the central controller 101 is configured to gather information from one or more of the following resources: the device 160, traffic statistics from the network elements 102, and the network administration settings, in order to determine if incoming traffic should be diverted, by the network elements 102, to the security server 120 for further processing. In one embodiment, the determination is made based the statistics gathered on traffic addressed to protected entities. That is, the controller establishes traffic baselines and detects deviations from these baselines based on the gathered statistics. Such a deviation is an indication of a potential DoS/DDoS attack that may trigger the traffic diversion.

In order to divert the incoming traffic, addressed to the destination server, the central controller is configured to program the network elements to perform this task. As will be discussed in greater detail below, designating the packets to be diverted does not change their destination address. Therefore, once processing is completed by the security server 120, the processed and mitigated traffic is injected back into the network through network element 102-3 and sent to the destination server 130.

The designation of packets to be diverted is performed by network elements 102 under the instruction of the central controller 101. In one embodiment, the central controller 101 is configured to instruct the peer and edge network elements to designate and clear the designation of all packets having the same network parameter. The network parameter may be, for example, a source IP address, a destination IP address, a destination port, or any combination thereof.

A peer network element is a network element of the SDN that the incoming traffic flows through. For example, an element 102-1 is a peer network element. An edge network element is a network element directly connected to a server 120, i.e., all traffic from and to a security server 120 flows through the edge network element. In the exemplary FIG. 1, element 102-2 is an edge network element.

According to one embodiment, the designation includes setting a "diversion field" in a header of the packet to a predefined value. The diversion field may be a pre-defined field in the IP (Layer-3) header or an Ethernet/MAC (Layer-2) header. Different embodiments for designating the packets are disclosed herein below.

As mentioned above, the central controller 101 can modify the flow tables at the network elements 102, or can make any other supported programming operation, such that each element should know where to forward an incoming packet based on the value in the diversion field. According to one embodiment, the central controller 101 is configured to enable the diversion of suspicious traffic received from the client 140 to the server 120. According to this embodiment, the security server 120 is configured to mitigate DoS/DDoS attacks as discussed above. The embodiments disclosed herein enable diversion of suspicious traffic on-the-fly without prior provisioning of the network elements by a network administrator.

It should be noted that the SDN 100 can be provisioned with more than one security server. In such configurations, the central controller can instruct all network elements as to which of the security servers (of the same type) to divert the traffic on a per destination server 130 basis. Therefore, this would enable provision of diversion capabilities with high availability and scalability of security services.

According to one embodiment, the central controller 101 communicates with the network elements 102 of the network 100 using the OpenFlow protocol, discussed above, through a secure channel established with each network element 102.

Figure 2:
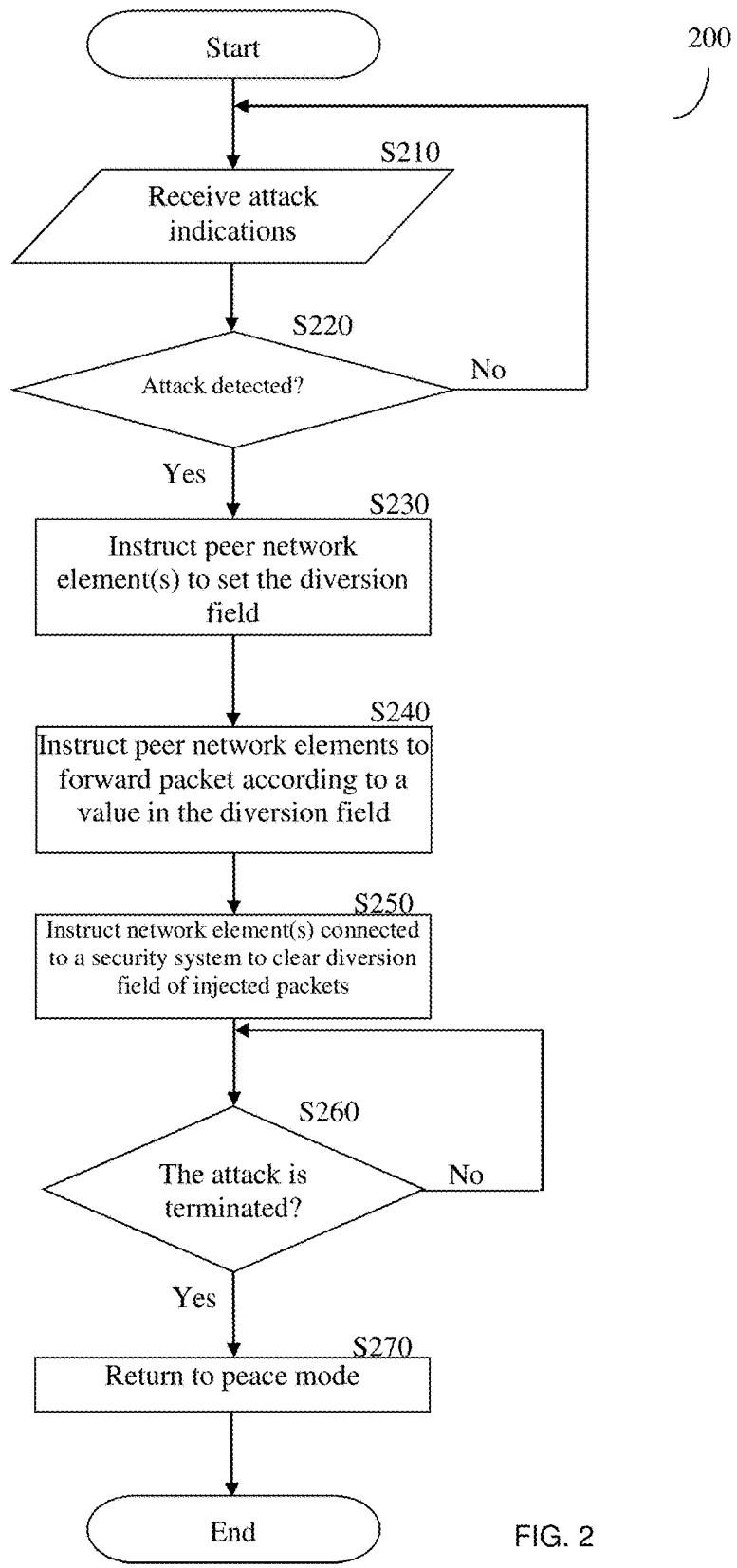
FIG. 2 is a flowchart illustrating a method for diverting suspicious traffic to a security server according to one embodiment.

FIG. 2 shows an exemplary and non-limiting flowchart 200 illustrating a method for diverting suspicious traffic in the SDN 100 according to one embodiment. There are two modes of operation for the central controller 101 and the network 100, "peace mode", and "attack mode". During the peace mode, the central controller 101 is configured to program all network elements 102 to perform the required regular routing and forwarding of packets. That is, all network elements 102 are programmed to forward incoming IP packets based only on their destination IP or MAC addresses as typically performed, for example, by conventional routers or switches. In the attack mode, suspicious incoming traffic from network 100 peer points is diverted to the security server 120 and only "clean traffic" is injected back to its destination.

At S210, the central controller 101 receives a plurality of attack indications from the attack detection device 160, or other indications of potential threats to the destination server. In one embodiment, attack indications can be achieved by statistics of traffic collected from one or more network elements 102.

The attack indications may include, for example, an attack alarm from the device 160, a high number of active connections, a high number of packets received per second, an indication that an incoming traffic is from an IP address included in a black list, indications collected from client authentication services (e.g., Radius servers, LDAP servers, "call-back" procedures, etc.), geo analysis information (e.g., the origin of a client's traffic in comparison to other clients), a type of content and/or application accessed by the client, behavioral analysis (e.g., comparing the clients' behavior to a normal behavior of the client), and so on. Alternatively or collectively, the controller 101 may analyze the attack indications to determine if an attack is being committed against the destination server 130.

At S220, a check is made to determine if a potential attack has been detected, and if so execution continues with S230; otherwise, execution returns to S210. A potential attack may be associated with a destination IP address of the destination server 130 that receives the suspicious traffic. Alternatively or collectively, a potential attack may be associated with a source IP address and a port number of a client that generates the suspicious traffic.

At S230, a peer network element (e.g., element 102-1) is instructed, by the central controller 101, to set a diversion field in each packet addressed to the destination server 130 (designated by its address along with other indications such as source IP addresses and destination L4 service, or port) under attack, to a value that indicates that the packet should be diverted to the server 120. A peer network element is a network element connected at the edge of the SDN 100. It should be noted that, during attack mode, all incoming suspicious traffic addressed to a protected destination server is redirected to the security server 120. That is, traffic from both attacker and legitimate clients are diverted to the security system 120. As a non-limiting example, a client 140 may be a legitimate client, while a client 145 may be an attacker. Traffic from both clients 140 and 145 is diverted to the server 120.

Various exemplary and non-limiting embodiments are disclosed herein for realizing the diversion field and its corresponding value. In one embodiment, the diversion field is an existing field in an IP packet's header, such as a header 310 and 320, shown in FIGS. 3A and 3B respectively, utilized to designate that a diversion is needed.

In one embodiment, various fields in an IPv4 packet header, such as the header 310 can utilized as the diversion field, for example, a TTL field 311, one of the bits in a flags field 312, a DSCP and ECN (also known as TOS) field 313, or any combination thereof. It should be noted that the different options can be utilized to divert the traffic to different destinations.

In another embodiment, various fields in an IPv6 packet header can be used to designate that diversion is required. In one embodiment, such fields include a Hop Limit field 321, a Traffic Class field 322, a Flow Label field 323, and an IPv6 extension header where a Destination Option header is used to designate the diversion or a combination thereof.

In another embodiment, a source MAC address field in an Ethernet (Layer-2) header is utilized as the diversion field. The source MAC address is set to a pre-defined unique value that can be used as an indication to diversion without any intervention and interruption to network operation. Because the designated source MAC has a unique value, it cannot be used by any other Ethernet network interfaces of the devices in the network 110, thereby setting the source MAC field of incoming packet, from peer network elements, to a unique pre-defined value can be used as an indication to the traffic diversion requirement.

In an embodiment, a set of such unique MAC addresses is defined to support diversion to multiple VAS servers. In the layer-2 SDN-based networks the MAC learning is typically performed by the central controller and not by each network element, thus the MAC learning operation in the network is not disturbed when the source MAC address is used as a diversion value. In layer-3 SDN-based networks, no MAC learning is performed based on a source MAC address. However, each router is programmed by the central controller not to update the source MAC address field, when such a field contains a per-defined unique value.

In one non-limiting embodiment, the diversion value of the diversion field is set by peer network elements, respective of the type of field being utilized in such a way that a network element 102 recognizes such value as not being a value conventionally used or defined by the IP protocol forwarding or Layer-2 switching. For example, for each packet addressed to a destination IP address of the destination server 130, the TTL field (311) or Hop limit field (321) is assigned to a value of higher than 128 (e.g., 255) when traffic diversion is required. This allows signing the packets while maintaining these fields' conventional functionality of infinite packet loop prevention.

Returning to FIG. 2, at S240, all network elements 102 are instructed to forward all packets having a diversion field's value that designates that a diversion is required, to the security server 120. In one embodiment, the diversion can be achieved by configuring the flow table of each network element 102. As a result, each network element 102 receiving a packet that should be diverted, forwards the packet to the security server 120 instead of to the destination sever 130. That is, incoming packets are forwarded not according to their destination IP address as in a traditional forwarding or switching paradigm. Following the example above, each network element checks the TTL value and forwards packets having a TTL value higher than 128 to the edge network. In addition, for cases in which the diversion field is the source MAC address, all network elements 102 are instructed by the central controller not to change the source MAC field in layer-2 (L2) Ethernet header.

At S250, the controller 101 is further configured to instruct a network element connected to the server 120 (e.g., a network element 102-3) to clear the diversion field of packets output by the server 120 and associated with the destination IP address of server 130, to indicate that the diversion is no longer required for these packets. For example, this can be achieved by changing the value of the TTL field or Hop limit field (acting as the diversion field) to a value of less than 128 (e.g., 127). Another example is to set the source MAC address to a MAC address of a NIC in the network element 102-3. In an alternative embodiment, the S250 is optional and changing the diversion field can be performed by the security server 120.

The security server 120 processes the diverted traffic to detect and mitigate malicious attacks including, but not limited to, DoS/DDoS attacks against the destination server 130. With this aim, the security server 120 implements various attack mitigation techniques discussed in the related art and some of which are also disclosed in the above-referenced U.S. Pat. Nos. 7,624,084 and 7,617,170. The server 120 acting as a security server, outputs legitimate "clean" traffic that can be safely forwarded to the destination server 130 and blocks malicious traffic from reaching the destination server 130. For example, traffic from client 145 (an attacker) is blocked by the server 120 while traffic from a legitimate client 140 is injected back to the network.

As noted above, the diversion field of packets output by the server 120 is cleared (or alternatively may be set to a different diversion value than the initial value) to indicate that no diversion is needed. Thus, packets injected to the network by the security server 120 will be directly forwarded to the destination server 130 by means of the network elements 102 in the path between the server 120 and the server 130. In one embodiment, the routing of the injected traffic is performed according to the traditional operation based on the destination IP address.

At S260, a check is made to determine if the detected attack is terminated; and if so, at S270, the central controller 101 is configured to instruct the peer network element of the network 100 not to set the diversion field to its diversion value. In an embodiment, the central controller 101 may further instruct all the network elements to forward packets according to their normal routing configuration, e.g., to implement a pre-defined IP routing and/or layer-2 switching operations. Thus, at the conclusion of S260, the network 100 returns to a "peace mode". If S260 results with a negative answer, execution waits at S260.

It should be noted that the method disclosed hereinabove provides a simple mechanism to divert malicious traffic to a secured center for the purpose of mitigating attacks and for injection of the legitimate traffic back to the network, so that only "clean" traffic is sent to a destination server. The disclosed method solves at least the complexity associated with the conventional solutions for diverting and injecting traffic back into the network.

Figure 4:
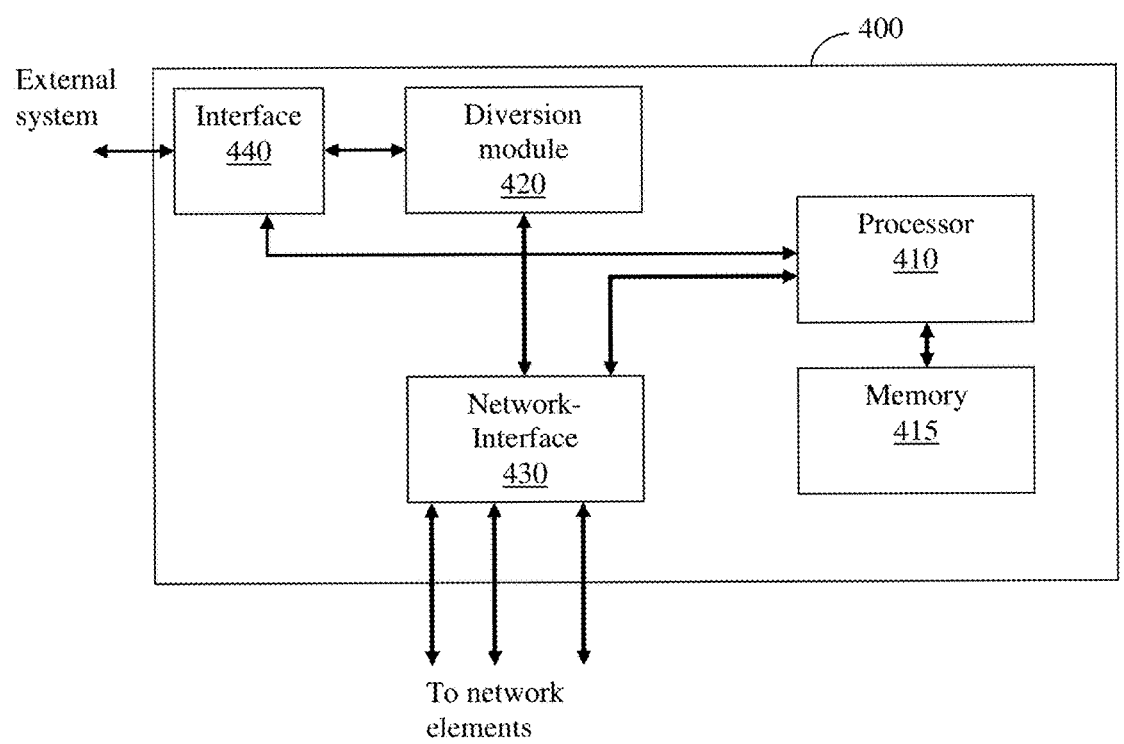
FIG. 4 is a block diagram of a central controller constructed according to one embodiment.

FIG. 4 shows an exemplary and non-limiting block diagram of the central controller 400 constructed according to one embodiment. The central controller 400 is operable in a SDN, such as those defined above, and is at least configured to execute the diversion methods described in greater detail above. The central controller 400 includes a processor 410 coupled to a memory 415, a diversion module 420, a network-interface module 430, and an interface 440 to an external system.

The network-interface module 430 allows the communication with the network elements of the SDN. In one embodiment, such communication uses the OpenFlow protocol discussed above through a secure channel established with each network element. In another embodiment, the communication is achieved through another control channel.

The interface 440 provides an interface to an external system, such as, but not limited to, a billing system, an attack detection device, a CRM system, an audit system, a security management system, and the like.

The diversion module 420 is configured to allow traffic diversion in the SDN as discussed above. Specifically, the diversion module 420 determines the diversion values to be set in the diversion fields and instructs the network elements as to how to set the diversion values and how to forward the packets based on the diversion values. The division module 420 also determines the security server that needs to be provisioned for each protected server on a per attack basis. The module 420 communicates with the network elements through the network-interface 430. The processor 410 uses instructions stored in the memory 415 to execute tasks generally performed by the central controllers of SDN as well as to control and enable the operation of the diversion module 420, a network-interface module 430, and an interface 440.

It should be noted that the teachings disclosed herein are also applicable to hybrid networks in which a SDN is a sub-network of a conventional network in which its elements cannot be programmed by a central controller. To allow the proper operation of the methods disclosed above in the hybrid network, network elements in the diversion path (i.e., from the peer network element to the datacenter) should be adapted to allow programmability by the central controller adapted to operate in a SDN (e.g., central controller 101).

The foregoing detailed description has set forth a few of the many forms that the disclosed embodiments can take. It is intended that the foregoing detailed description be understood as an illustration of selected forms that the disclosed embodiments can take and not as a limitation to the definition of the invention and/or the claimed embodiments.

Most preferably, the various embodiments disclosed herein can be implemented as any combination of hardware, firmware, and software. Moreover, the software is preferably implemented as an application program tangibly embodied on a program storage unit or computer readable medium. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

What is claimed is:

1. A method for mitigating of cyber-attacks in a software defined network (SDN), comprising:
    operating a central controller and the SDN in a peace mode;
    monitoring traffic addressed to at least one destination server to detect at least an attack performed against the at least one destination server;
    switching an operation of the central controller to an attack mode, upon detection of an attack against the at least one destination server; and
    instructing, by the central controller, network elements of the SDN to divert all suspicious incoming traffic addressed to the at least one destination server to at least one security server selected from a group of security servers, thereby mitigating the detected attack.

2. The method of claim 1, further comprising:
    receiving an indication that the detected attack has been terminated; and
    returning the operation of the central controller and SDN to the peace mode.

3. The method of claim 1, further comprising:
    programming, by the central controller, network elements of the SDN to perform required regular routing and forwarding actions of traffic during the peace mode.

4. The method of claim 1, wherein during the attack mode the method further comprises:
    instructing, by the central controller, the network elements to divert suspicious incoming traffic from the destination server to the security server and divert clean traffic back to the destination server.

5. The method of claim 4, further comprising:
    instructing at least one peer network element in the SDN to mark a diversion field in each packet in the incoming traffic addressed to the destination server, wherein each network element in the SDN receiving the packet with the marked diversion field is programmed to divert the packet to the security server; and
    instructing edge network elements in the SDN to unmark the diversion field of each packet output by the security server.

6. The method of claim 5, wherein the diversion field is at least one field in any one of an internet protocol (IP) header and a MAC header.

7. The method of claim 6, wherein the at least one field in the IP header is at least one of: a time to live (TTL) field, a VXLAN header field, a bit in a flags field, a hop limit field, a traffic class field, and an IP extension header, wherein the least one field in the IP header depends on an IP version in the network.

8. The method of claim 7, wherein marking the diversion field further comprises setting the diversion field to a value not conventionally used or defined by the IP protocol for the respective at least one field.

9. The method of claim 6, wherein the at least one field in the MAC header is a source MAC address field being set to an address not used by any network element.

10. The method of claim 6, wherein the designation of packets that are required for diversion is performed per source IP, per destination IP address, and per a protocol type.

11. The method of claim 1, wherein the detected attack is at least one of: a denial of service (DoS) attack and a DDoS attack.

12. The method of claim 1, wherein an OpenFlow protocol is utilized for communication between the network elements.

13. A non-transitory computer readable medium having stored thereon instructions for causing one or more processing units to execute the computerized method according to claim 1.

14. A system for mitigating of cyber-attacks in a software defined networking (SDN) based network, comprising:
    a processor;
    a network-interface module connected to the SDN and configured to communicate and program network elements of the SDN; and
    a memory connected to the processor and configured to contain a plurality of instructions that when executed by the processor configure the system to:
    operate a central controller and the SDN in a peace mode;
    monitor traffic addressed to at least one destination server to detect at least an attack performed against the at least one destination server;
    switch an operation of the central controller to an attack mode, upon detection of an attack against the at least one destination server; and
    instruct, by the central controller, network elements of the SDN to divert all suspicious incoming traffic addressed to the at least one destination server to at least one security server selected from a group of security servers, thereby mitigating the detected attack.

15. The system of claim 14, further configured to:
    receive an indication that the detected attack has been terminated; and
    return the operation of the central controller and SDN to the peace mode.

16. The system of claim 14, further configured to:
    program, by the central controller, network elements of the SDN to perform required regular routing and forwarding actions of traffic during the peace mode.

17. The system of claim 14, wherein during the attack mode the system is further configured to:
    instruct, by the central controller, the network elements to divert suspicious incoming traffic from the destination server to the security server and divert clean traffic back to the destination server.

18. The system of claim 17, further configured to:
    instruct at least one peer network element in the SDN to mark a diversion field in each packet in the incoming traffic addressed to the destination server, wherein each network element in the SDN receiving the packet with the marked diversion field is programmed to divert the packet to the security server; and
    instruct edge network elements in the SDN to unmark the diversion field of each packet output by the security server.

19. The system of claim 18, wherein the diversion field is at least one field in any one of an internet protocol (IP) header and a MAC header.

20. The system of claim 19, wherein the at least one field in the IP header is at least one of: a time to live (TTL) field, a VXLAN header field, a bit in a flags field, a hop limit field, a traffic class field, and an IP extension header, wherein the least one field in the IP header depends on an IP version in the network.

21. The system of claim 20, wherein marking the diversion field further comprises setting the diversion field to a value not conventionally used or defined by the IP protocol for the respective at least one field.

22. The system of claim 19, wherein the at least one field in the MAC header is a source MAC address field being set to an address not used by any network element.

23. The system of claim 19, wherein the designation of packets that are required for diversion is performed per source IP, per destination IP address, and per a protocol type.

24. The system of claim 14, wherein the detected attack is at least one of: a denial of service (DoS) attack and a DDoS attack.

25. The system of claim 14, wherein an OpenFlow protocol is utilized for communication between the network elements.

26. The method of claim 1, wherein the suspicious incoming traffic is eventually diverted to at least one security server selected from the group of security servers.

27. The system of claim 15, wherein the system is further configured to:
  eventually divert the suspicious incoming traffic to the at least one security server selected from the group of security servers.

* * * * *